US009899873B2

(12) United States Patent
Bell et al.

(10) Patent No.: US 9,899,873 B2
(45) Date of Patent: Feb. 20, 2018

(54) SYSTEM AND METHOD FOR GENERATING A POWER RECEIVER IDENTIFIER IN A WIRELESS POWER NETWORK

(71) Applicant: Energous Corporation, Pleasanton, CA (US)

(72) Inventors: Douglas Bell, Pleasanton, CA (US); Michael Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 820 days.

(21) Appl. No.: 14/286,289

(22) Filed: May 23, 2014

(65) Prior Publication Data

US 2015/0340911 A1 Nov. 26, 2015

(51) Int. Cl.

| H02J 50/00 | (2016.01) |
|---|---|
| H02J 50/10 | (2016.01) |
| H02J 50/20 | (2016.01) |
| H02J 50/23 | (2016.01) |
| H02J 50/27 | (2016.01) |
| H02J 50/40 | (2016.01) |
| H02J 50/80 | (2016.01) |
| H02J 17/00 | (2006.01) |

(52) U.S. Cl.
CPC .............. *H02J 17/00* (2013.01); *H02J 50/80* (2016.02)

(58) Field of Classification Search
CPC . H02J 5/005; H02J 7/025; H02J 17/00; H04B 5/0025–5/0093; B60L 11/182; B60L 11/1829–11/1831; Y02T 90/122; H01F 38/14; H01F 2038/143–2038/146; A61B 1/00029; A61N 1/3787

USPC .......................................... 307/104; 320/108
See application file for complete search history.

(56) References Cited

U.S. PATENT DOCUMENTS

| 787,412 A | 4/1905 | Tesla |
|---|---|---|
| 3,434,678 A | 3/1969 | Brown et al. |
| 3,696,384 A | 10/1972 | Lester |

(Continued)

FOREIGN PATENT DOCUMENTS

| CN | 203826555 U | 9/2014 |
|---|---|---|
| CN | 104090265 A | 10/2014 |

(Continued)

OTHER PUBLICATIONS

International Search Report dated Jan. 27, 2015 corresponding to International Patent Application No. PCT/US2014/037170, 4 pages.

(Continued)

*Primary Examiner* — Rexford Barnie
*Assistant Examiner* — Thai Tran
(74) *Attorney, Agent, or Firm* — Morgan, Lewis & Bockius LLP

(57) ABSTRACT

Embodiments in the present disclosure may be directed to a system and method that may be used to generate a unique identifier for one or more wireless power devices such as one or more wireless power receivers, wireless power transmitters, GUI management devices, and system management servers among others, within a wireless power network. The method may use automated software embedded on a chip that may run when a wireless power device boots up for the first time. The unique ID may allow easy associations of wireless power devices with user defined names.

22 Claims, 3 Drawing Sheets

(56) References Cited

U.S. PATENT DOCUMENTS

| | | |
|---|---|---|
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,664,920 B1 | 12/2003 | Mott et al. |
| 6,798,716 B1 | 9/2004 | Charych |
| 6,803,744 B1 | 10/2004 | Sabo |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,451,839 B2 | 11/2008 | Perlman |
| 7,463,201 B2 | 12/2008 | Chiang et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,925,308 B2 | 4/2011 | Greene et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,658 B2 | 7/2013 | Von Novak et al. |
| 8,552,597 B2 | 10/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,854,176 B2 | 10/2014 | Zeine |
| 8,860,364 B2 | 10/2014 | Low et al. |
| 8,897,770 B1 | 11/2014 | Frolov et al. |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook et al. |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,444,283 B2 | 9/2016 | Son et al. |
| 9,450,449 B1 | 9/2016 | Leabman et al. |

(56) References Cited

U.S. PATENT DOCUMENTS

| | | | |
|---|---|---|---|
| 9,461,502 B2 | 10/2016 | Lee et al. | |
| 9,520,725 B2 | 12/2016 | Masaoka et al. | |
| 9,520,748 B2 | 12/2016 | Hyde et al. | |
| 9,522,270 B2 | 12/2016 | Perryman et al. | |
| 9,537,354 B2 | 1/2017 | Bell et al. | |
| 9,537,357 B2 | 1/2017 | Leabman | |
| 9,537,358 B2 | 1/2017 | Leabman | |
| 9,538,382 B2 | 1/2017 | Bell et al. | |
| 9,544,640 B2 | 1/2017 | Lau | |
| 9,559,553 B2 | 1/2017 | Bae | |
| 9,564,773 B2 | 2/2017 | Pogorelik et al. | |
| 9,590,444 B2 | 3/2017 | Walley | |
| 9,620,996 B2 | 4/2017 | Zeine | |
| 2002/0028655 A1 | 3/2002 | Rosener et al. | |
| 2002/0034958 A1 | 3/2002 | Oberschmidt et al. | |
| 2002/0054330 A1* | 5/2002 | Jinbo | G06F 3/1221 358/1.15 |
| 2002/0072784 A1 | 6/2002 | Sheppard et al. | |
| 2002/0095980 A1 | 7/2002 | Breed et al. | |
| 2002/0103447 A1 | 8/2002 | Terry | |
| 2002/0133592 A1* | 9/2002 | Matsuda | A63F 13/12 709/225 |
| 2002/0172223 A1 | 11/2002 | Stilp | |
| 2003/0005759 A1 | 1/2003 | Breed et al. | |
| 2003/0058187 A1 | 3/2003 | Billiet et al. | |
| 2003/0076274 A1 | 4/2003 | Phelan et al. | |
| 2003/0179152 A1 | 9/2003 | Watada et al. | |
| 2003/0179573 A1 | 9/2003 | Chun | |
| 2003/0192053 A1 | 10/2003 | Sheppard et al. | |
| 2004/0019624 A1 | 1/2004 | Sukegawa | |
| 2004/0020100 A1 | 2/2004 | O'Brian et al. | |
| 2004/0036657 A1 | 2/2004 | Forster et al. | |
| 2004/0066251 A1 | 4/2004 | Eleftheriades et al. | |
| 2004/0113543 A1 | 6/2004 | Daniels | |
| 2004/0119675 A1 | 6/2004 | Washio et al. | |
| 2004/0107641 A1 | 7/2004 | Walton et al. | |
| 2004/0130442 A1 | 7/2004 | Breed | |
| 2004/0142733 A1 | 7/2004 | Parise | |
| 2004/0145342 A1 | 7/2004 | Lyon | |
| 2004/0196190 A1 | 10/2004 | Mendolia et al. | |
| 2004/0207559 A1 | 10/2004 | Milosavljevic | |
| 2004/0218759 A1* | 11/2004 | Yacobi | H04N 7/1696 380/210 |
| 2004/0259604 A1 | 12/2004 | Mickle et al. | |
| 2004/0263124 A1 | 12/2004 | Wieck et al. | |
| 2005/0007276 A1 | 1/2005 | Barrick et al. | |
| 2005/0030118 A1 | 2/2005 | Wang | |
| 2005/0046584 A1 | 3/2005 | Breed | |
| 2005/0055316 A1* | 3/2005 | Williams | G06Q 20/24 705/65 |
| 2005/0093766 A1 | 5/2005 | Turner | |
| 2005/0116683 A1 | 6/2005 | Cheng | |
| 2005/0117660 A1 | 6/2005 | Vialle et al. | |
| 2005/0171411 A1 | 8/2005 | KenKnight | |
| 2005/0198673 A1 | 9/2005 | Kit et al. | |
| 2005/0227619 A1 | 10/2005 | Lee et al. | |
| 2005/0232469 A1 | 10/2005 | Schofield | |
| 2005/0282591 A1 | 12/2005 | Shaff | |
| 2006/0013335 A1 | 1/2006 | Leabman | |
| 2006/0019712 A1 | 1/2006 | Choi | |
| 2006/0030279 A1 | 2/2006 | Leabman et al. | |
| 2006/0092079 A1 | 5/2006 | de Rochemont | |
| 2006/0094425 A1 | 5/2006 | Mickle et al. | |
| 2006/0113955 A1 | 6/2006 | Nunally | |
| 2006/0136004 A1 | 6/2006 | Cowan et al. | |
| 2006/0160517 A1 | 7/2006 | Yoon | |
| 2006/0183473 A1 | 8/2006 | Ukon | |
| 2006/0190063 A1 | 8/2006 | Kanzius | |
| 2006/0192913 A1 | 8/2006 | Shutou et al. | |
| 2006/0238365 A1 | 10/2006 | Vecchione et al. | |
| 2006/0266564 A1 | 11/2006 | Perlman et al. | |
| 2006/0266917 A1 | 11/2006 | Baldis et al. | |
| 2006/0278706 A1 | 12/2006 | Hatakeyama et al. | |
| 2006/0284593 A1 | 12/2006 | Nagy et al. | |
| 2006/0287094 A1 | 12/2006 | Mahaffey et al. | |
| 2007/0007821 A1 | 1/2007 | Rossetti | |
| 2007/0019693 A1 | 1/2007 | Graham | |
| 2007/0021140 A1 | 1/2007 | Keyes | |
| 2007/0060185 A1 | 3/2007 | Simon et al. | |
| 2007/0070490 A1 | 3/2007 | Tsunoda et al. | |
| 2007/0093269 A1 | 4/2007 | Leabman et al. | |
| 2007/0097653 A1 | 5/2007 | Gilliland et al. | |
| 2007/0103110 A1 | 5/2007 | Sagoo | |
| 2007/0106894 A1* | 5/2007 | Zhang | H04L 9/32 713/170 |
| 2007/0109121 A1 | 5/2007 | Cohen | |
| 2007/0139000 A1 | 6/2007 | Kozuma | |
| 2007/0149162 A1 | 6/2007 | Greene et al. | |
| 2007/0173196 A1 | 7/2007 | Gallic | |
| 2007/0173214 A1 | 7/2007 | Mickle et al. | |
| 2007/0178857 A1 | 8/2007 | Greene et al. | |
| 2007/0178945 A1 | 8/2007 | Cook et al. | |
| 2007/0182367 A1 | 8/2007 | Partovi | |
| 2007/0191074 A1 | 8/2007 | Harrist et al. | |
| 2007/0191075 A1 | 8/2007 | Greene et al. | |
| 2007/0197281 A1 | 8/2007 | Stronach | |
| 2007/0210960 A1 | 9/2007 | Rofougaran et al. | |
| 2007/0222681 A1 | 9/2007 | Greene et al. | |
| 2007/0257634 A1 | 11/2007 | Leschin et al. | |
| 2007/0273486 A1 | 11/2007 | Shiotsu | |
| 2007/0298846 A1 | 12/2007 | Greene et al. | |
| 2008/0014897 A1 | 1/2008 | Cook et al. | |
| 2008/0062062 A1 | 3/2008 | Borau et al. | |
| 2008/0062255 A1 | 3/2008 | Gal | |
| 2008/0067874 A1 | 3/2008 | Tseng | |
| 2008/0074324 A1 | 3/2008 | Puzella et al. | |
| 2008/0089277 A1 | 4/2008 | Aledander et al. | |
| 2008/0113816 A1 | 5/2008 | Mahaffey et al. | |
| 2008/0122297 A1 | 5/2008 | Arai | |
| 2008/0123383 A1 | 5/2008 | Shionoiri | |
| 2008/0129536 A1 | 6/2008 | Randall et al. | |
| 2008/0169910 A1 | 7/2008 | Greene et al. | |
| 2008/0197802 A1 | 8/2008 | Onishi | |
| 2008/0204342 A1 | 8/2008 | Kharadly | |
| 2008/0204350 A1 | 8/2008 | Tam et al. | |
| 2008/0210762 A1 | 9/2008 | Osada et al. | |
| 2008/0211458 A1 | 9/2008 | Lawther et al. | |
| 2008/0248758 A1 | 10/2008 | Schedelbeck et al. | |
| 2008/0248846 A1 | 10/2008 | Stronach et al. | |
| 2008/0278378 A1 | 11/2008 | Chang et al. | |
| 2008/0309452 A1 | 12/2008 | Zeine | |
| 2009/0002493 A1 | 1/2009 | Kates | |
| 2009/0019183 A1 | 1/2009 | Wu et al. | |
| 2009/0036065 A1 | 2/2009 | Siu | |
| 2009/0047998 A1 | 2/2009 | Alberth, Jr. | |
| 2009/0058354 A1 | 3/2009 | Harrison | |
| 2009/0058361 A1 | 3/2009 | John | |
| 2009/0067208 A1 | 3/2009 | Martin et al. | |
| 2009/0096412 A1 | 4/2009 | Huang | |
| 2009/0096413 A1 | 4/2009 | Partovi | |
| 2009/0102292 A1 | 4/2009 | Cook et al. | |
| 2009/0102296 A1 | 4/2009 | Greene et al. | |
| 2009/0108679 A1 | 4/2009 | Porwal | |
| 2009/0128262 A1 | 5/2009 | Lee et al. | |
| 2009/0157911 A1* | 6/2009 | Aihara | G11C 16/22 710/17 |
| 2009/0200985 A1 | 8/2009 | Zane et al. | |
| 2009/0206791 A1 | 8/2009 | Jung | |
| 2009/0207092 A1 | 8/2009 | Nysen et al. | |
| 2009/0218884 A1 | 9/2009 | Soar | |
| 2009/0218891 A1 | 9/2009 | McCollough | |
| 2009/0219903 A1 | 9/2009 | Alamouti et al. | |
| 2009/0243397 A1 | 10/2009 | Cook et al. | |
| 2009/0264069 A1 | 10/2009 | Yamasuge | |
| 2009/0280866 A1 | 11/2009 | Lo et al. | |
| 2009/0281678 A1 | 11/2009 | Wakamatsu | |
| 2009/0284082 A1 | 11/2009 | Mohammadian | |
| 2009/0284083 A1 | 11/2009 | Karalis et al. | |
| 2009/0284220 A1 | 11/2009 | Toncich et al. | |
| 2009/0284227 A1 | 11/2009 | Mohammadian et al. | |
| 2009/0284325 A1 | 11/2009 | Rossiter et al. | |
| 2009/0291634 A1 | 11/2009 | Saarisalo | |
| 2009/0299175 A1 | 12/2009 | Bernstein et al. | |
| 2009/0315412 A1 | 12/2009 | Yamamoto et al. | |

(56) References Cited

U.S. PATENT DOCUMENTS

| | | |
|---|---|---|
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0151808 A1 | 6/2010 | Toncich et al. |
| 2010/0156721 A1 | 6/2010 | Alamouti et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0237709 A1 | 9/2010 | Hall et al. |
| 2010/0244576 A1 | 9/2010 | Hillan et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0074342 A1 | 3/2011 | MacLaughlin |
| 2011/0074349 A1* | 3/2011 | Ghovanloo ............... H02J 50/90 320/108 |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto et al. |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1* | 12/2011 | Failing ..................... B60L 3/00 705/39 |
| 2011/0304216 A1 | 12/2011 | Baarman |
| 2011/0304437 A1 | 12/2011 | Beeler |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0074891 A1 | 3/2012 | Anderson et al. |
| 2012/0231856 A1 | 3/2012 | Lee et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |

(56) References Cited

U.S. PATENT DOCUMENTS

| | | |
|---|---|---|
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0212072 A1 | 8/2012 | Miyabayashi et al. |
| 2012/0214536 A1 | 8/2012 | Kim et al. |
| 2012/0200399 A1 | 9/2012 | Chae |
| 2012/0228956 A1 | 9/2012 | Kamata |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1* | 12/2012 | Lu .................. H02J 17/00 320/108 |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0049471 A1 | 2/2013 | Oleynik |
| 2013/0049475 A1 | 2/2013 | Kim et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1* | 3/2013 | Waffenschmidt .... H01R 13/514 307/104 |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0178253 A1 | 7/2013 | Karaoguz |
| 2013/0181881 A1 | 7/2013 | Christie et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0049422 A1 | 2/2014 | Von Novak et al. |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0086125 A1 | 3/2014 | Polo et al. |
| 2014/0091756 A1 | 4/2014 | Ofstein et al. |
| 2014/0091968 A1 | 4/2014 | Harel et al. |
| 2014/0111147 A1 | 4/2014 | Soar |
| 2014/0113689 A1 | 4/2014 | Lee |

(56) References Cited

U.S. PATENT DOCUMENTS

| | | |
|---|---|---|
| 2014/0117946 A1 | 5/2014 | Muller et al. |
| 2014/0118140 A1 | 5/2014 | Amis |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0152117 A1 | 6/2014 | Sankar |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0175893 A1 | 6/2014 | Sengupta et al. |
| 2014/0176054 A1 | 6/2014 | Porat et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0029397 A1 | 1/2015 | Leabman et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0108848 A1 | 4/2015 | Joehren |
| 2015/0115877 A1 | 4/2015 | Arai et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0222126 A1 | 8/2015 | Leabman et al. |
| 2015/0236520 A1 | 8/2015 | Baarman |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |

(56) References Cited

U.S. PATENT DOCUMENTS

| | | |
|---|---|---|
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005516 A9 | 1/2017 | Leabman et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0163076 A1 | 6/2017 | Park et al. |

FOREIGN PATENT DOCUMENTS

| | | |
|---|---|---|
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 0111716 A1 | 2/2001 |
| WO | 2004077550 A1 | 9/2004 |
| WO | 2003091943 A1 | 11/2006 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | WO 2010138994 A1 | 12/2010 |
| WO | 2011112022 A2 | 9/2011 |
| WO | WO 2012177283 A1 | 12/2012 |
| WO | 2013035190 A1 | 3/2013 |
| WO | WO 2013031988 A1 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016048512 A1 | 3/2016 |
| WO | WO 2016187357 A1 | 11/2016 |

OTHER PUBLICATIONS

International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
International Search Report dated Sep. 12, 2014 corresponding to International Patent Application No. PCT/US2014/037072, 3 pages.
Energous Corp., Written Opinion, PCT/US2014/037170 , dated Sep. 15, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2014/041534, dated Dec. 29, 2015, 7 pgs.
Energous Corp., IPRP, PCT/US2014/046956, dated Jan. 19, 2016, 7 pgs.
Energous Corp., Written Opinion, PCT/US2014/037072, dated Sep. 12, 2014, 5 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/067291, dated Mar. 4, 2016, 10 pgs.
Energous Corp., IPRP, PCT/US2015/067291, dated Jul. 4, 2017, 4 pgs.
Energous Corp., ISRWO, PCT/US2015/067242, dated Mar. 16, 2016, 9 pgs.
Energous Corp., IPRP, PCT/US2015/067242, dated Jun. 27, 2017, 7 pgs.
Energous Corp., ISRWO, PCT/US2015/067243, dated Mar. 10, 2016, 11 pgs.
Energous Corp., IPRP, PCT/US2015/067243, dated Jun. 27, 2017, 7 pgs.

(56) References Cited

OTHER PUBLICATIONS

Energous Corp., ISRWO, PCT/US2014/037109, dated Apr. 8, 2016, 12 pgs.
Energous Corp., IPRP, PCT/US2014/037109, dated Apr. 12, 2016, 9 pgs.
Energous Corp., ISRWO, PCT/US2015/067275, dated Mar. 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016, 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp.. IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4, 2017, 8 pgs.
Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp.. IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp., ISRWO, PCT/US2014/059317, dated Feb. 24, 2015, 13 pgs.
Energous Corp.. IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp.. IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016. 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP , PCT/US2014/045237, dated Jan. 12, 2016, 12 pgs.
Energous Corp., ISRWO , PCT/US2014/054897, dated Feb. 17, 2015, 10 pgs.
Energous Corp., IPRP , PCT/US2014/054897, dated Mar. 15, 2016, 8 pgs.
Energous Corp., ISRWO , PCT/US2015/067334, dated Mar. 3, 2016, 6 pgs.
Energous Corp., IPRP , PCT/US2015/067334, dated Jul. 4, 2017, 5 pgs.
Energous Corp., ISRWO , PCT/US2014/047963, dated Nov. 7, 2014, 13 pgs.
Energous Corp., IPRP , PCT/US2014/047963, dated Jan. 26, 2016, 10 pgs.
Energous Corp., ISRWO , PCT/US2014/054891, dated Dec. 18, 2014, 12 pgs.
Energous Corp., IPRP , PCT/US2014/054891, dated Mar. 15, 2016, 10 pgs.
Energous Corp., ISRWO , PCT/US2014/054953, dated Dec. 4, 2014, 7 pgs.
Energous Corp., IPRP , PCT/US2014/054953, dated Mar. 22, 2016, 5 pgs.
Energous Corp., ISRWO , PCT/US2015/067294, dated Mar. 29, 2016, 7 pgs.
Energous Corp., IPRP , PCT/US2015/067294, dated Jul. 4, 2017, 6 pgs.
Energous Corp., ISRWO , PCT/US2014/062672 dated Jan. 26, 2015, 11 pgs.
Energous Corp., IPRP , PCT/US2014/062672 dated May 10, 2016, 8 pgs.

(56) References Cited

OTHER PUBLICATIONS

Energous Corp., ISRWO, PCT/US2014/044810 dated Oct. 21, 2014, 12 pgs.
Energous Corp., IPRP, PCT/US2014/044810, dated Jan. 5, 2016, 10 pgs.
Energous Corp., ISRWO, PCT/US2015/067271, dated Mar. 11, 2016, 6 pgs.
Energous Corp., IPRP, PCT/US2015/067271, dated Jul. 4, 2017, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp.. IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp.. ISRWO, PCT/US2016/068987, dated May 8, 2017, 10 pgs.
Energous Corp., ISRWO, PCT/US2016/069316, dated Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334.
Zhai, "A Practical wireless charging system based on ultrawideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract.
Paolo Nenzi et al; "U-Helix: On-chip short conical antenna", 2013 7th European Conference on Antennas and Propagation (EUCAP), ISBN: 978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.

\* cited by examiner

SYSTEM AND METHOD FOR GENERATING A POWER RECEIVER IDENTIFIER IN A WIRELESS POWER NETWORK

CROSS-REFERENCE TO RELATED APPLICATIONS

The present disclosure is related to U.S. non-provisional patent application DWV-3DPF-010 entitled "Methodology for Pocket-forming"; and DWV-3DPF-028 entitled "Methodology for Multiple Pocket-Forming"; DWV-3DPF-015 entitled "Method for 3 Dimensional Pocket-forming"; DWV-3DPF-027 entitled "Receivers for Wireless Power Transmission"; DWV-3DPF-029 entitled "Transmitters for Wireless Power Transmission" invented by Michael Leabman, each of which are incorporated by reference in their entirety herein.

BACKGROUND

Field of the Disclosure

The present disclosure relates generally to wireless power networks, and more specifically to a system and method for generating a wireless power receiver identifier in a wireless power network.

Background Information

Electronic devices such as laptop computers, smartphones, portable gaming devices, tablets and so forth may require power for performing their intended functions. This may require having to charge electronic equipment at least once a day, or in high-demand electronic devices more than once a day. Such an activity may be tedious and may represent a burden to users. For example, a user may be required to carry chargers in case his electronic equipment is lacking power. In addition, users have to find available power sources to connect to. Lastly, users must plugin to a wall power socket or other power supply to be able to charge his or her electronic device.

An approach to mitigate this issue may include using RF waves through suitable power transmission techniques such as pocket-forming. This approach may provide wireless power transmission while eliminating the use of wires or pads for charging devices. In addition, electronic equipment may require less components as typical wall chargers may not be required. In some cases, even batteries may be eliminated as a device may fully be powered wirelessly.

The approach may enable the creation of wireless power networks similar in structure to regular wireless local area networks (WLAN) where a wireless access point is used to provide internet or intranet access to different wireless devices. A wireless power transmitter may provide wireless power charging to a plurality of wireless power receiver devices. As in a WLAN, a wireless power network may require a way to identify and associate wireless power receivers to have better control of such devices to when and which device to charge.

For the foregoing reasons, there is a need for a way to identify and control wireless power receiver devices within a wireless power network.

SUMMARY

Embodiments in the present disclosure may be directed to a system and method for generating a unique identifier for one or more wireless power devices (that is, one or more wireless power receivers, wireless power transmitters, or GUI management devices, or system management servers, and others) within a wireless power network. The system and method may include suitable automated software embedded on a chip that may run when a wireless power device boots up for the first time. The unique ID may allow easy associations of wireless power devices with different user defined names.

In one aspect of the present disclosure, a system architecture that may enable the registration and communication controls between wireless power transmitter and one or more wireless power receivers is disclosed. Wireless power receivers may include covers or customer pocket-forming enabled devices.

In one embodiment, wireless power transmitter may include a microprocessor that integrates a power transmitter manager app (PWR TX MGR APP), and a third party application programming interface (third party API) for a Bluetooth Low Energy chip (BTLE CHIP HW). Wireless power transmitter may also include an antenna manager software (Antenna MGR Software) to control an RF antenna array that may be used to form controlled RF waves which may converge in 3-D space and create pockets of energy on wireless power receivers (covers or customer pocket-forming enabled devices).

In another embodiment, covers may include a power receiver app (PWR RX APP), a third party application programming interface (third party API) for a Bluetooth Low Energy chip (BTLE CHIP HW), and a radio frequency (RF) antenna array which may be used to receive and utilize the pockets of energy sent from wireless power transmitter.

In yet another embodiment, customer pocket-forming enabled devices may refer to a wireless device such as smartphones, tablets, or any of the like that may include an integrated wireless power receiver chip (not shown in FIG. 1) for wireless power charging. Customer pocket-forming enabled devices may include a power receiver app (PWR RX APP), and a third party application programming interface (third party API) for a Bluetooth Low Energy chip (BTLE CHIP HW). Customer pocket-forming enabled devices may also include an RF antenna array which may used to receive and utilize pockets of energy sent from wireless power transmitter. GUI may be downloaded from any suitable application store and may run on any suitable operating system such as iOS and Android, among others.

In another aspect of the present disclosure, an exemplary method may be used to generate a unique identifier for wireless power devices within a wireless power network is disclosed. The method may employ suitable software embedded on a chip that may be triggered the first time a wireless power receiver is turned on. The method may first check if a NV RAM ID flag is set in the wireless power receiver, if the ID flag is set then the software reads the ID from the NV RAM (at a different address) and continues normal operation. If ID flag is not set, the software runs a suitable random number generator method to generate a random ID which may be 32-bits or greater. Once the ID is generated, the software writes the ID to NV RAM unique address. Finally, the software may write the unique 32-bits (or greater) ID flag to NV RAM unique address, read ID from NV RAM and continue normal operation.

In another embodiment, the method may also be used to not only generate unique IDs for wireless power receivers, but also to generate unique IDs for wireless power transmitters and GUIs. By generating unique IDs for each of the components in a wireless power network, the components may be more easily associated to users and have friendly names. For example, a user may have in his or her home more than one wireless power transmitter located at different places such as the living room, the bedrooms, and the kitchen among others. Then the power transmitter's unique ID may be associated with a custom label, stored in said transmitter's system database, for each of the wireless power transmitters at different locations.

In a further aspect of the present disclosure, a flowchart of a method for registering and associating a wireless power receiver to a wireless power network is provided. The method may include automated software embedded on a wireless power receiver chip that may be triggered when a wireless power receiver boots up. Therefore, the method may start when a wireless power receiver boots up when turned on by the user. Then, the wireless power receiver broadcasts ads, which may include an unique ID number, to any power transmitter manager and GUI that is within its range. Then, power transmitter manager and GUI, that are within range of the wireless power receiver broadcast, receive and decode the advertisement. Subsequently, power transmitter manager may store the unique ID number of said wireless power receiver in a database. This database may serve to store relevant information from wireless power receivers such as, identifiers, voltage ranges, location, signal strength and/or any relevant information from the wireless power receiver. Following the method, GUI may update and sync all relevant information in its copy of the system database, for better control of the wireless power devices. GUI may then ask the user to assign a name for the wireless power receiver that may have joined the wireless power network. Finally, the user assigns a name of its preference and the GUI syncs that name with the database.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
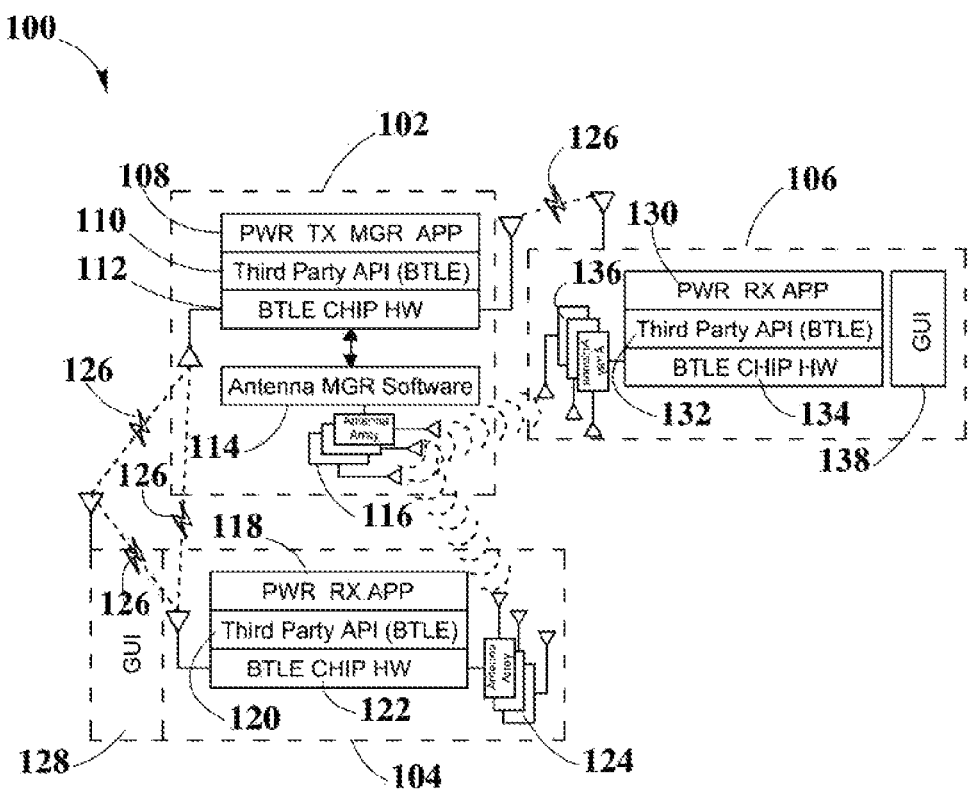
FIG. 1 shows a system architecture in which one or more embodiments of the present disclosure may operate.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Definitions

As used here, the following terms may have the following definitions:

"Real time communication" refers to communicating the status of data at the receiver at the continuing present time, where a proprietary algorithm may read the present state of important information at the receiver continually and rapidly with only 1/100th of a second of delay.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device including at least one antenna element, at least one rectifying circuit and at least one power converter, which may utilize pockets of energy for powering, or charging an electronic device.

"Pocket-forming" may refer to generating two or more RF waves which converge in 3-D space, forming controlled constructive and destructive interference patterns.

"Pockets of energy" may refer to areas or regions of space where energy or power may accumulate in the form of constructive interference patterns of RF waves.

Description of the Drawings

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

FIG. 1 shows a system architecture 100 for a wireless power network, according to an embodiment. System architecture 100 may enable the registration and communication controls between wireless power transmitter 102 and one or more wireless power receivers within a wireless power network. Wireless power receivers may include covers 104 and customer pocket-forming enabled devices 106.

In one embodiment, wireless power transmitter 102 may include a microprocessor that integrates a power transmitter manager app 108 (PWR TX MGR APP), and a third party application programming interface 110 (Third Party API) for a Bluetooth Low Energy chip 112 (BTLE CHIP HW). Wireless power transmitter 102 may also include an antenna manager software 114 (Antenna MGR Software) to control an RF antenna array 116 that may be used to transmit controlled Radio Frequency (RF) waves which may converge in 3-D space. These RF waves may be controlled through phase and/or relative amplitude adjustments to form constructive and destructive interference patterns (pocket-forming). Pockets of energy may form at constructive interference patterns that may be 3-Dimensional in shape whereas null-spaces may be generated at destructive interference patterns. Pockets of energy may be formed on wireless power receivers (covers 104 and customer pocket-forming enabled devices 106). In some embodiment, Bluetooth Low Energy chip 112 may be another type of wireless protocol such as WiFi or the like.

Power transmitter manager app 108 may include a database (not shown), which may store relevant information from wireless power receivers such as, identifiers, voltage ranges, location, signal strength and/or any relevant information from the wireless power receiver.

Power transmitter manager app 108 may call third party application programming interface 110 for running a plurality of functions such as start a connection, end a connection, and send data among others. Third party application programming interface 110 may command Bluetooth Low Energy chip 112 according to the functions called by power transmitter manager app 108.

Third party application programming interface 110 at the same time may call power transmitter manager app 108 through a callback function which may be registered in the power transmitter manager app 108 at boot time. Third party application programming interface 110 may have a timer callback that may go for ten times a second, and may send callbacks every time a connection begins, a connection ends, a connection is attempted, or a message is received.

Covers 104 may include a power receiver app 118 (PWR RX APP), a third party application programming interface 120 (Third party API) for a Bluetooth Low Energy chip 122 (BTLE CHIP HW), and a RF antenna array 124 which may be used to receive and utilize the pockets of energy sent from wireless power transmitter 102.

Power receiver app 118 may call third party application programming interface 120 for running a plurality of functions such as start a connection, end the connection, and send data among others. Third party application programming interface 120 may have a timer callback that may go for ten times a second, and may send callbacks every time a connection begins, a connection ends, a connection is attempted, or message is received.

Covers 104 may be paired to a wireless device such as a smartphone, or tablet among others via a BTLE connection 126 by using a graphical user interface (GUI 128) that may be downloaded from any suitable application store and may run on any suitable operating system such as iOS and Android, among others. Covers 104 may also communicate with wireless power transmitter 102 via a BTLE connection 126 to send important data such as an identifier for the device as well as battery level information, antenna voltage, geographic location data, real-time received power feedback, or other information that may be of use for the wireless power transmitter 102.

In other embodiments, GUI 128 may also be installed on a wireless device (smartphones or tablets) that may not have the cover 104. GUI 128 may perform operations to communicate with power transmitter manager app 108 via BTLE connection 126 or any other wireless communication protocols such as WiFi, and LAN among others.

Customer pocket-forming enabled devices 106 may refer to a wireless device such as smartphones, tablets, or any of the like that may include an integrated wireless power receiver chip (not shown in FIG. 1) for wireless power charging. Customer pocket-forming enabled devices 106 may include a power receiver app 130 (PWR RX APP), and a third party application programming interface 132 (Third Party API) for a Bluetooth Low Energy chip 134 (BTLE CHIP HW). Customer pocket-forming enabled devices 106 may also include an RF antenna array 136 which may used to receive and utilize pockets of energy sent from wireless power transmitter 102. GUI 138 may be downloaded from any suitable application store and may run on any suitable operating system such as iOS and Android, among others.

Power receiver app 130 may call third party application programming interface 132 for running a plurality of functions such as start a connection, end the connection, and send data among others. Third party application programming interface 132 may have a timer callback that may go for ten times a second, and may send callbacks every time a connection begins, a connection ends, a connection is attempted, or message is received.

Customer pocket-forming enabled devices 106 may also communicate with wireless power transmitter 102 via a BTLE connection 126 to send important data such as an identifier for the device as well as battery level information, antenna voltage, geographic location data, real-time received power feedback, or other information that may be of use for the wireless power transmitter 102.

Figure 2:
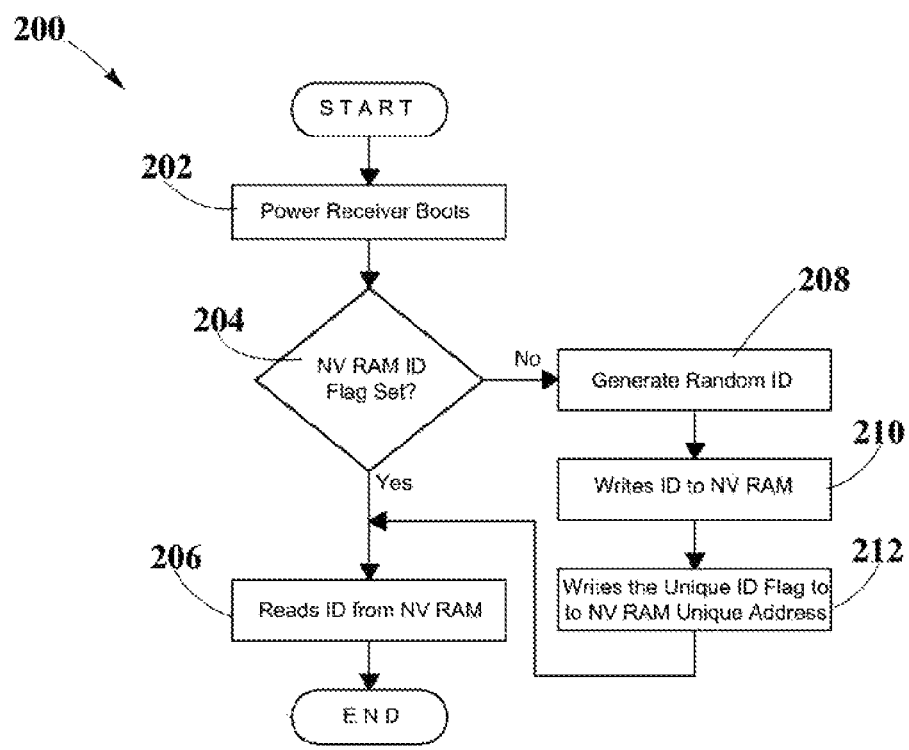
FIG. 2 shows a flowchart of a method that may be used to generate a unique identifier for a wireless power receiver device within a wireless power network.

FIG. 2 shows a flowchart of a method 200 that may be used to generate a unique identifier for one or more wireless power receiver within a wireless power network.

Method 200 may include automated software embedded on a wireless power receiver chip that may be triggered the first time a wireless power receiver is turned on.

In one embodiment, method 200 may start at step 202 when a wireless power receiver, either a cover or a customer pocket-forming enable device, boots up the first time within a wireless power network. Then, at step 204, method 200 may check if the ID flag at a unique address is in non-volatile (NV) RAM is set in the wireless power receiver. If ID flag is set, at step 206, the method 200 reads from its unique address in NVRAM in the wireless power receiver and it continues normal operation. If ID flag is not set, then at step 208, the method 200 triggers a suitable random number generator method to generate a random ID which may be 32-bits or greater. Once the ID is generated, at step 210, the method 200 writes the ID to its unique address in NV RAM. Finally, at step 212, method 200 may write the unique 32-bits (or greater) ID flag to unique address in NV RAM, read ID from NV RAM and continue normal operation.

In another embodiment, method 200 may also be used to not only generate unique IDs for wireless power receivers, but also to generate unique IDs for wireless power transmitters and GUIs. By generating unique IDs for each of the components in a wireless power network, the components may be more easily associated to users and have friendly names. For example, a user may have in his or her home more than one wireless power transmitter located at different places such as the living room, bedrooms, and kitchen among others. Then the power transmitter's unique ID may be associated with a custom label for each of the wireless power transmitters at different locations.

Figure 3:
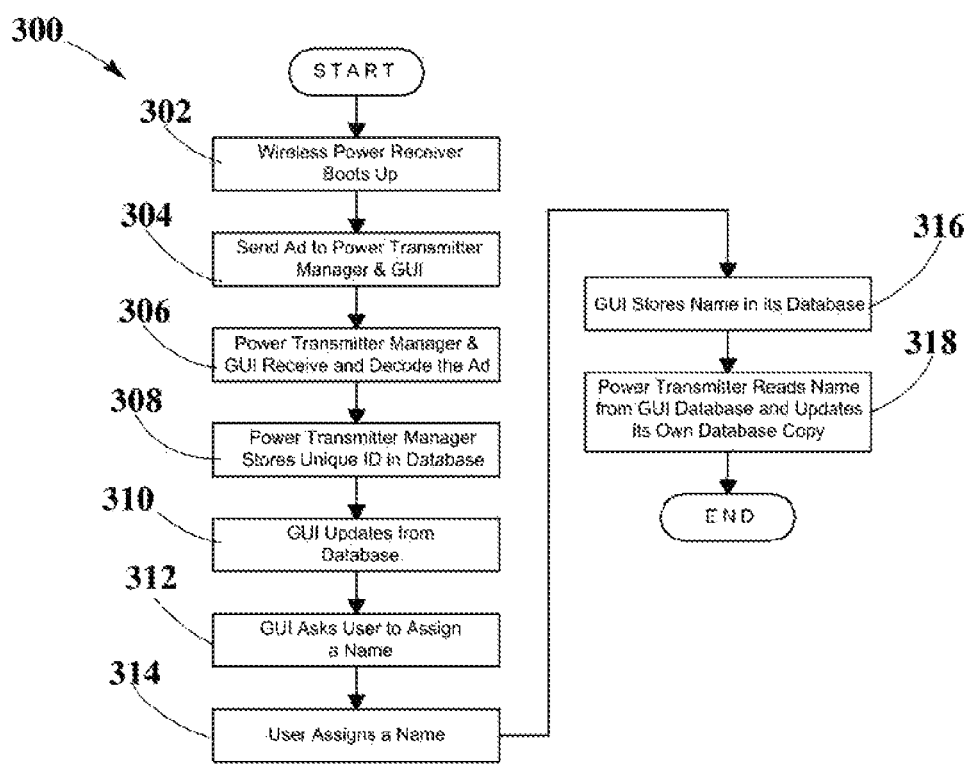
FIG. 3 shows a flowchart of a method for registering and associating a wireless power receiver to a wireless power network.

FIG. 3 shows a flowchart of a method 300 for registering and associating one or more wireless power receivers to a wireless power network.

In one aspect of the present disclosure, method 300 may include automated software embedded on a wireless power receiver chip that may be triggered when a wireless power receiver boots up. Therefore, method 300 may start at step 302, when a wireless power receiver boots up when turned on by the user. Then, at step 304, the wireless power receiver broadcasts advertisement, which may include a unique ID number, to any power transmitter manager and GUI that is within its range. Next, at step 306, power transmitter manager and GUI, that are within the radio of the wireless power receiver broadcast, receive and decode the advertisement. Then, power transmitter manager, at step 308, may store the unique ID number of said wireless power receiver in a database. This database may serve to store relevant information from wireless power receivers such as, identifiers, voltage ranges, location, signal strength and/or any relevant information. Following method 300, at step 310, GUI may update and sync all relevant information from said transmitter's database for better control of the wireless power devices. At step 312, GUI may ask the user to assign a name for the wireless power receiver that may have joined the wireless power network. Next, at step 314, the user assigns a name of its preference. Then, at step 316, GUI syncs that name and stores it in its database. Finally, at step 318, power transmitter manager reads name from GUI database and updates its own database copy. The system database in power transmitter devices and GUI devices may be identical between every device, when up to date. All system devices may operate and communicate so as to keep each one's database up to date.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. An apparatus for wirelessly receiving power, comprising:
   a processor;
   a wireless communication radio, operatively coupled to the processor;
   memory, operatively coupled to the processor; and
   a power receiver operatively coupled to the processor, the power receiver being configured to wirelessly radio frequency (RF) waves that converge and constructively interfere near the power receiver, wherein the controlled RF waves are wirelessly transmitted by a remote power transmitter to the power receiver after the power receiver has joined a wireless power network that includes the remote power transmitter,
   wherein the processor is configured to;
      obtain a unique identifier of the power receiver, wherein the unique identifier is (i) retrieved from the memory and (ii) used to join the wireless power network; and
      after the power receiver has joined the wireless power network;
         cause the power receiver to begin wirelessly receiving the controlled RF waves and utilizing energy from the constructively interfering RF waves to provide power or charge to the apparatus;
         receive a request from a device associated with the wireless power network to provide a user-assigned name for the power receiver; and
         in response to receiving the request:
            instruct a user of the apparatus to provide the user-assigned name for the power receiver; and transmit the user-assigned name to the device associated with the wireless power network, wherein the user-assigned name is used to identify the power receiver to a plurality of devices associated with the wireless power network.

2. The apparatus of claim 1, wherein the memory is a non-volatile random access memory (NVRAM).

3. The apparatus of claim 2, wherein the processor is further configure to determine if the unique identifier of the power receiver is stored at a unique address in the NVRAM memory.

4. The apparatus of claim 1, wherein the processor is further configured to generate the unique identifier of the power receiver using a random number generator.

5. The apparatus of claim 1, wherein the processor is further configured to determine if the unique identifier of the power receiver is stored in the memory during a boot-up process.

6. The apparatus of claim 1, further comprising at least one of a power receiver app, an application programming interface and a graphical user interface.

7. The apparatus of claim 6, wherein the user-assigned name is received via the graphical user interface.

8. The apparatus of claim 1, wherein the device associated with the wireless power network is the remote power transmitter.

9. The apparatus of claim 1, wherein the device associated with the wireless power network is a power transmitter manager that controls operation of the remote power transmitter.

10. A method for wirelessly receiving power, the method comprising:
at an apparatus with a processor, a wireless communication radio, memory, and a power receiver operatively coupled to the processor, the power receiver being configured to wirelessly receive controlled radio frequency (RF) waves that converge and constructively interfere near the power receiver, wherein the controlled RF waves are wirelessly transmitted by a remote power transmitter to the power receiver after the power receiver has joined a wireless power network that includes the remote power transmitter:
obtaining a unique identifier of the power receiver, wherein the unique identifier is (i) retrieved from the memory and (ii) used to join the wireless power network; and
after the power receiver has joined the wireless power network:
causing the power receiver to begin wirelessly receiving the controlled RF waves and utilizing energy from the constructively interfering RF waves to provide power or charge to the apparatus;
receiving a request from a device associated with the wireless power network to provide a user-assigned name for the power receiver; and
in response to receiving the request:
instructing a user of the apparatus to provide the user-assigned name for the power receiver; and
transmitting the user-assigned name to the device associated with the wireless power network, wherein the user-assigned name is used to identify the power receiver to a plurality of devices associated with the wireless power network.

11. The method of claim 10, wherein the memory is a non-volatile random access memory (NVRAM).

12. The method of claim 11, wherein the method further comprises determining if the unique identifier of the power receiver is stored at a unique address in the NVRAM memory.

13. The method of claim 10, wherein the unique identifier of the power receiver is generated using a random number generator.

14. The method of claim 10, wherein the method further comprises: determining if the unique identifier of the power receiver is stored in the memory during a boot-up process.

15. The method of claim 10, wherein the device associated with the wireless power network is the remote power transmitter.

16. The method of claim 10, wherein the device associated with the wireless power network is a power transmitter manager that controls operation of the remote power transmitter.

17. An apparatus for wirelessly transmitting power, comprising:
a processor;
a wireless communication radio, operatively coupled to the processor;
memory; operatively coupled to the processor; and
a power transmitter operatively coupled to the processor, the power transmitter being configured to wirelessly transmit controlled radio frequency (RF) waves that converge and constructively interfere near a remote power receiver, wherein the controlled RF waves are wirelessly transmitted to the remote power receiver after the power transmitter has joined a wireless power network that includes the remote power receiver,
wherein the processor is configured to;
obtain a unique identifier of the power transmitter, wherein the unique identifier is (i) retrieved from the memory and (ii) used to join the wireless power network; and after the power transmitter has joined the wireless power network:
cause the power transmitter to begin wirelessly transmitting the controlled RF waves to the remote power receiver, wherein the remote power receiver utilizes energy from the constructively interfering RF waves to provide power or charge to an electronic device;
receive a request from a device associated with the wireless power network to provide a user-assigned name for the power transmitter; and in response to receiving the request:
instruct a user of the apparatus to provide the user-assigned name for the power transmitter; and
transmit the user-assigned name to the device associated with the wireless power network, wherein the user-assigned name is used to identify the power transmitter to a plurality of devices associated with the wireless power network.

18. The apparatus of claim 17, wherein the memory is a non-volatile random access memory (NVRAM).

19. The apparatus of claim 18, wherein the processor is further configure to determine if the unique identifier of the power transmitter is stored at a unique address in the NVRAM memory.

20. The apparatus of claim 17, wherein the processor is further configured to generate the unique identifier of the power transmitter using a random number generator.

21. The apparatus of claim 17, the processor is further configured to determine if the unique identifier of the power transmitter is stored in the memory during a boot-up process.

22. The apparatus of claim 17, wherein the device associated with the wireless power network is a power transmitter manager that controls operation of the power transmitter.

* * * * *

UNITED STATES PATENT AND TRADEMARK OFFICE
CERTIFICATE OF CORRECTION

PATENT NO. : 9,899,873 B2
APPLICATION NO. : 14/286289
DATED : February 20, 2018
INVENTOR(S) : Bell et al.

It is certified that error appears in the above-identified patent and that said Letters Patent is hereby corrected as shown below:

In the Claims

Claim 1, Column 8, Line 44, please delete "wirelessly radio" and insert --wirelessly receive controlled radio--;

Claim 3, Column 9, Line 9, please delete "further configure to" and insert --further configured to--;

Claim 19, Column 10, Line 60, please delete "further configure to" and insert --further configured to--.

Signed and Sealed this
Twenty-second Day of May, 2018

Andrei Iancu
*Director of the United States Patent and Trademark Office*